April 25, 1933. W. H. SILVER 1,906,113
RIDGE BURSTER
Filed Jan. 5, 1927 2 Sheets-Sheet 2
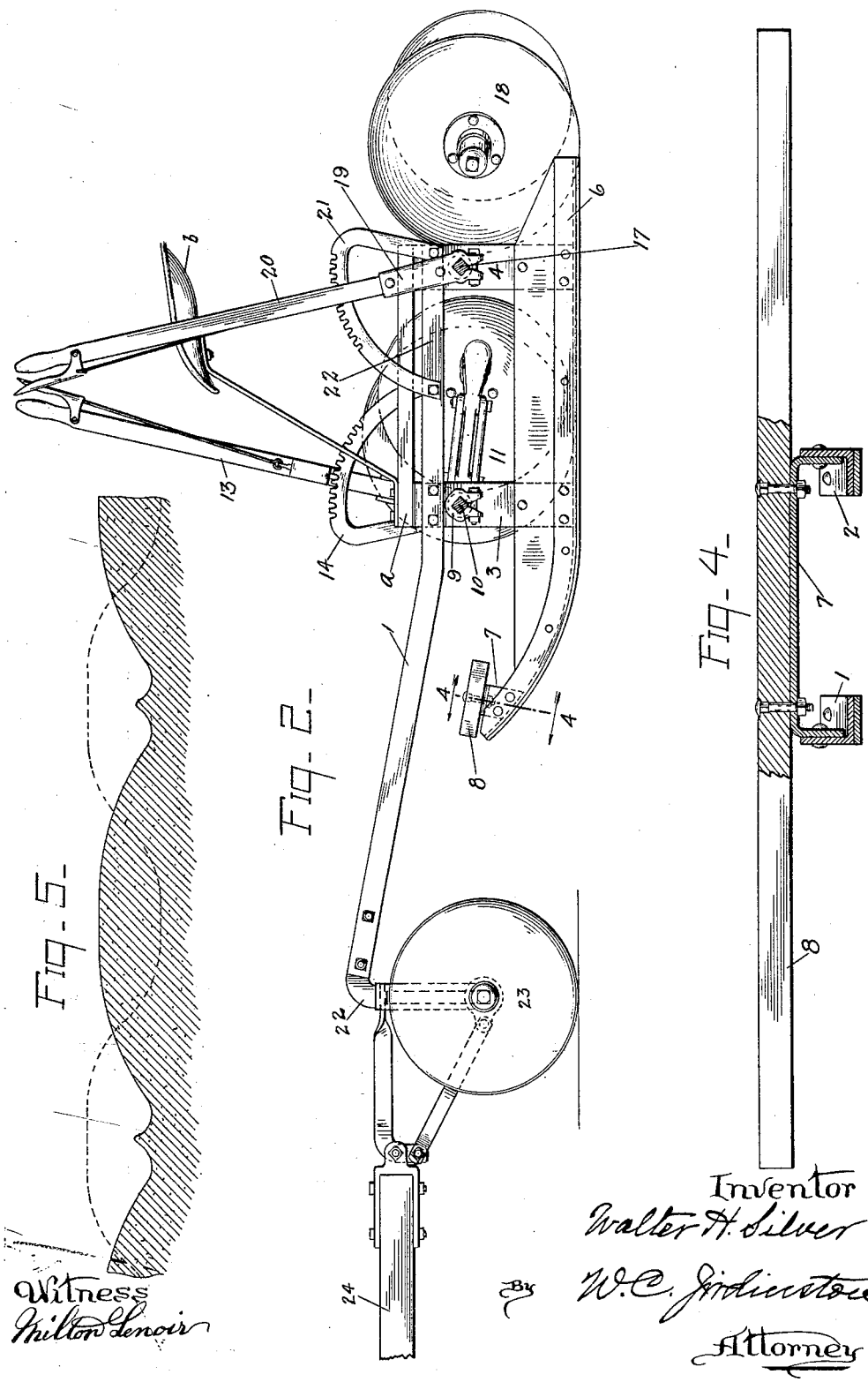

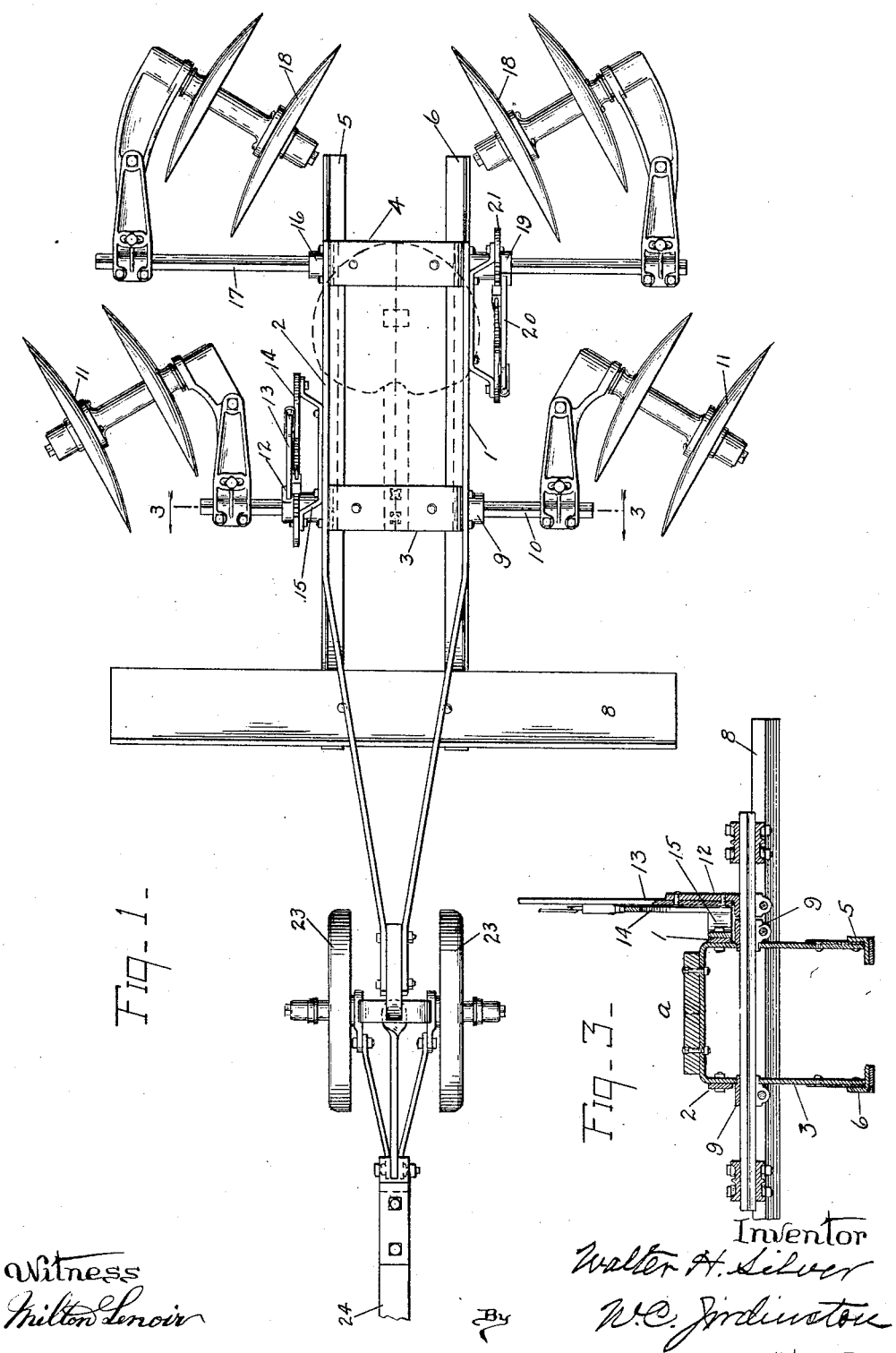

Patented Apr. 25, 1933                                                                  1,906,113

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

RIDGE BURSTER

Application filed January 5, 1927. Serial No. 159,045.

My invention relates to that type of agricultural implements employed for leveling ridged land and commonly known as ridge bursters, and an object of my invention is to include in such an implement certain features by which the operation of the implement is materially improved, other objects being clearly disclosed in the following specification:

Referring to the drawings in which similar numerals indicate identical parts;

Figure 1 is a plan view of an implement in which my improvements are embodied with part of the frame and the seat removed;

Figure 2 is a side elevation of Figure 1 with the near front and rear gangs of disks removed;

Figure 3 is a sectional view on the line 3—3 of Figure 1;

Figure 4 is a sectional view on the line 4—4 of Figure 2, and

Figure 5 is a diagrammatic illustration showing, in dotted line, a ridge formation and in full lines the condition of the ground after operation of the implement.

The frame is composed of side bars 1 and 2 bolted, respectively, to opposite sides of a forward arch 3 and a rear arch 4, and converging forwardly from the arch 3 to a draft device hereinafter described. Boards $a$ are secured to the arches 3 and 4 to form a platform on which a seat $b$ is supported, shown in dotted lines in Figure 1 and in full lines in Figure 2, the side bars 1 and 2, and the boards $a$ constituting the frame of the implement. The arches 3 and 4 are spaced apart in parallelism, and to the lower ends thereof, respectively, are riveted or bolted parallel runners 5 and 6 extending rearwardly of the rear arch 4 a desired distance and from the forward arch 3, the runners 5 and 6 are curved upward forwardly and on their forward ends is mounted an arched support 7 to which is bolted a transversely extending beam 8.

Split bearings 9 are journaled in suitable openings in the arch 3 and support a transverse shaft 10, preferably rectangular in cross-section, on which are carried gangs of disks 11 arranged for outthrow operation.

An arm 12 is clamped on the shaft 10 and to it is secured a lever 13 provided with the usual type of latch to engage with notches in a sector 14, the latter being secured to a bracket 15 bolted on the side bar 2. Split bearings 16 are journaled in suitable openings in the arch 4 and support a shaft 17, similar to the shaft 10, carrying gangs of disks 18 arranged to operate with an inthrow. An arm 19 is clamped on the shaft 17; a lever 20 is secured to said arm and is provided with a latch to engage notches in a sector 21 mounted on a bracket 22 bolted to the side bar 1. By the construction just described, it is readily apparent that by operation of the levers 13 and 20, the shafts 10 and 17 are rockable to raise or lower the gangs 11 and 18.

As previously stated, the side bars 1 and 2 converge forwardly to a draft device; they also have a slight inclination, and their forward ends are bolted to a gooseneck 22 on which a truck is pivoted, the latter including wheels 23 and a draft pole 24. I do not limit myself, however, to the particular type of truck shown, as it may be varied without altering to any degree the operation and efficiency of my invention.

I have shown and described a two-row implement in which the runners 1 and 2 and the truck travel in the trench between two ridges, which are destroyed by the disks and overturned into the adjoining trenches to leave a field, in which the implement is being operated, in practically a level condition ready for seeding, the rear disks turning the soil into the trench in which the runners and truck are traveling, and the forward disks operating to fill adjoining trenches. Accuracy in operation is necessary for continuous efficiency, and this is acquired by perfect control of the implement when in use, either in regulating the depth of operation of the disks, or by preserving the level of the implement, for the level may be broken by obstruction in the trench, in which the truck and runners are traveling, by a narrowing of the trench from wash, or from other causes that may operate to tilt the implement laterally, lifting one side thereof and consequently depressing the opposite side.

To prevent this disturbance in the effective operation of the implement, I provide the beam 8, secured to the forward ends of the runners 1 and 2, having a sufficient inclination forwardly to readily ride over rough parts of the ridges, for the beam 8 extends transversely of the implement a sufficient distance each side thereof to cover the ridges being destroyed by the following gangs of disks. It will be readily apparent that a tendency of the implement to tilt will be resisted by the beam 8 in contact with the ridge on the side of the trench in the direction of the tilting strain so that the strain will be resisted and the efficiency of operation of the implement will be maintained, and this efficiency is strengthened by the truck which, traveling in the furrow close to the source of the draft power, operates to prevent any possibility of the implement being diverted from its working position by lateral displacement.

What I claim is—

In a ridge burster, the combination of a pair of runners spaced apart and parallel, a front arch and a rear arch rigidly connected to said runners, a frame including side bars secured to said arches and having their forward portions converging forwardly, a laterally steerable truck pivotally mounted on the forward end of said bars and adapted to travel in a furrow between ridges, a shaft rockably journaled on the front arch, a shaft rockably journaled on the rear arch, earth-working devices supported on said shafts, and a forwardly inclined beam extending transversely of said runners between said devices and the truck and rigidly secured on the runners.

WALTER H. SILVER.